(12) United States Patent
Saeki

(10) Patent No.: US 10,852,710 B2
(45) Date of Patent: Dec. 1, 2020

(54) THERMAL DISPLACEMENT COMPENSATION APPARATUS

(71) Applicant: FANUC CORPORATION, Yamanashi (JP)

(72) Inventor: Masahiro Saeki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 344 days.

(21) Appl. No.: 16/019,542

(22) Filed: Jun. 27, 2018

(65) Prior Publication Data

US 2019/0011898 A1 Jan. 10, 2019

(30) Foreign Application Priority Data

Jul. 4, 2017 (JP) .................................. 2017-131394

(51) Int. Cl.
*G05B 19/404* (2006.01)
*G06N 3/08* (2006.01)
*G05B 13/02* (2006.01)

(52) U.S. Cl.
CPC ......... *G05B 19/404* (2013.01); *G05B 13/027* (2013.01); *G05B 2219/32335* (2013.01); *G05B 2219/33034* (2013.01); *G05B 2219/49207* (2013.01); *G06N 3/08* (2013.01)

(58) Field of Classification Search
None
See application file for complete search history.

(56) References Cited

U.S. PATENT DOCUMENTS

| 5,523,953 A | 6/1996 | Araie et al. |
| 2008/0235971 A1 | 10/2008 | Sakai et al. |
| 2017/0090430 A1 | 3/2017 | Nakazawa |

(Continued)

FOREIGN PATENT DOCUMENTS

| CN | 103984287 A | 8/2014 |
| JP | H3-221252 A | 9/1991 |

(Continued)

OTHER PUBLICATIONS

John, Kinetic Modeling, Simulation and Optimal Operation of Fluid Catalytic Cracking of Crude oil, Doctoral Thesis, University of Bradford, 2018, pp. 1-251 (Year: 2018).*

(Continued)

*Primary Examiner* — Wilbert L Starks
(74) *Attorney, Agent, or Firm* — Hauptman Ham, LLP

(57) ABSTRACT

A thermal displacement compensation apparatus for compensating a dimensional measurement error due to a thermal displacement of a workpiece, including a machine learning device for learning shape measurement data at the time of inspection of the workpiece, wherein the machine learning device observes image data showing the temperature distribution of the workpiece and shape data after machining as state variables representing the current state of the environment, acquires judgment data indicating the shape measurement data at the time of inspection, and learns the image data showing the temperature distribution of the workpiece and shape data after machining and the shape measurement data at the time of inspection in association with each other using the observed state variables and the acquired judgment data.

9 Claims, 8 Drawing Sheets

(56) References Cited

U.S. PATENT DOCUMENTS

| | | |
|---|---|---|
| 2017/0091667 A1 | 3/2017 | Yukawa |
| 2017/0111000 A1 | 4/2017 | Saito et al. |
| 2017/0293862 A1 | 10/2017 | Kamiya et al. |

FOREIGN PATENT DOCUMENTS

| | | |
|---|---|---|
| JP | H3-243706 A | 10/1991 |
| JP | H4-54685 A | 2/1992 |
| JP | H5-69276 | 3/1993 |
| JP | H5-116053 A | 5/1993 |
| JP | H6-8107 A | 1/1994 |
| JP | H7-75937 A | 3/1995 |
| JP | H11-114776 A | 4/1999 |
| JP | 2000-198047 | 7/2000 |
| JP | 2002-224935 A | 8/2002 |
| JP | 2005-52917 A | 3/2005 |
| JP | 2005-279877 A | 10/2005 |
| JP | 2006-55918 | 3/2006 |
| JP | 2006-130590 A | 5/2006 |
| JP | 2008-249352 A | 10/2008 |
| JP | 2012-240137 A | 12/2012 |
| JP | 2016-161482 A | 9/2016 |
| JP | 2017-64837 A | 4/2017 |
| JP | 2017-68566 A | 4/2017 |
| JP | 2017-79514 A | 4/2017 |
| JP | 2017-188030 A | 10/2017 |

OTHER PUBLICATIONS

Office Action in JP Application No. 2017-131394, dated Aug. 20, 2019, 4pp.

Office Action in JP Application No. 2017-131394, dated Mar. 12, 2019, 6pp.

* cited by examiner

THERMAL DISPLACEMENT COMPENSATION APPARATUS

RELATED APPLICATIONS

The present application claims priority of Japanese Application No. 2017-131394, filed Jul. 4, 2017, the disclosure of which is hereby incorporated by reference herein in its entirety.

BACKGROUND OF THE INVENTION

1. Field of the Invention

The present invention relates to a thermal displacement controller, and more particularly to a technique for easily and highly accurately compensating a measurement error due to thermal displacement of a workpiece.

2. Description of the Related Art

A workpiece expands or contracts depending on temperatures. Therefore, inspection of the dimensions of the workpiece after machining needs to be performed in a state of sufficient thermal equilibrium (or at a predetermined temperature which is set in consideration of the use environment of the workpiece, etc.).

Accordingly, an environment and time for bringing the workpiece to the optimum temperature for inspection are required.

Japanese Patent Application Laid-Open No. 2002-224935 discloses a technique of compensating the measured dimensions of a workpiece using a neural network that takes the temperature of the workpiece measured with a contact-type temperature sensor as an input and outputs thermal displacement compensation amounts for the measured dimensions. With this technique, the dimensional inspection can be performed even in a state in which thermal equilibrium has not been sufficiently attained.

However, it is not realistic to use a pasting-type temperature sensor (such as a contact-type sensor like a thermocouple) when performing shape inspection of a workpiece because such a sensor is an obstacle to the shape inspection. There is also a problem that know-how and trial and error are required to determine temperature measurement locations (how many temperature sensors are necessary and where on the workpiece the sensors should be pasted).

SUMMARY OF THE INVENTION

It is therefore an object of the present invention to provide a thermal displacement compensation apparatus capable of easily and highly accurately compensating a measurement error due to thermal displacement of a workpiece.

A thermal displacement compensation apparatus according to one embodiment of the present invention is a thermal displacement compensation apparatus for compensating a dimensional measurement error due to thermal displacement of a workpiece, and comprises a machine learning device for learning shape measurement data at the time of inspection of the workpiece. The machine learning device includes: a state observing unit for observing image data showing the temperature distribution of a workpiece and shape data after machining as state variables representing the current state of environment; a judgment data acquisition unit for acquiring judgment data indicating shape measurement data at the time of inspection; and a learning unit for learning the image data showing the temperature distribution of the workpiece and shape data after machining and the shape measurement data at the time of inspection in association with each other using the state variables and the judgment data.

The state variables can include ambient temperature of the workpiece.

The ambient temperature of the workpiece may be the temperature of a machine tool for machining the workpiece.

The state variables can include information about the acquisition time of the image data showing the temperature distribution of the workpiece and the acquisition time of the shape data after machining.

The judgement data can include an evaluation result of an error between actual dimensions and designed values of the workpiece.

The learning unit can calculate the state variables and the judgement data in a multilayer structure.

The learning unit can learn the shape measurement data at the time of inspection by using the state variables obtained from the workpiece machined by a plurality of machine tools and the judgment data.

The machine learning device may be realized by cloud computing, fog computing, or edge computing.

A machine learning device according to one embodiment of the present invention is a machine learning device for learning shape measurement data at the time of inspection of a workpiece, and comprises: a state observing unit for observing image data showing the temperature distribution of a workpiece and shape data after machining as state variables representing the current state of environment; a judgment data acquisition unit for acquiring judgment data indicating shape measurement data at the time of inspection; and a learning unit for learning the image data showing the temperature distribution of the workpiece and shape data after machining and the shape measurement data at the time of inspection in association with each other using the state variables and the judgment data.

With the present invention, it is possible to provide a thermal displacement compensation apparatus capable of easily and highly accurately compensating a measurement error due to thermal displacement of a workpiece.

DETAILED DESCRIPTION OF THE PREFERRED EMBODIMENTS

Figure 1A:
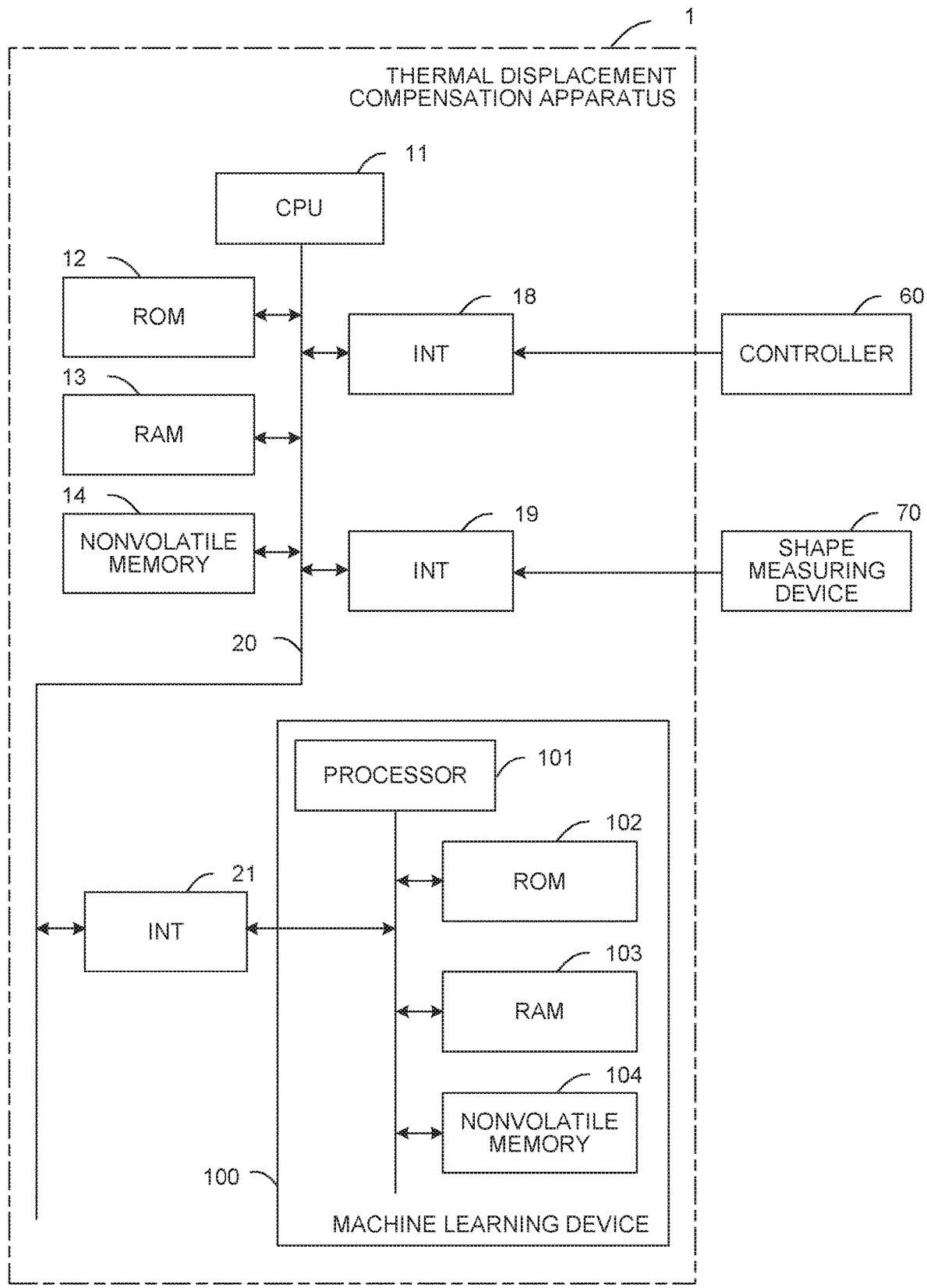
FIG. 1A is a block diagram illustrating the configuration of a thermal displacement compensation apparatus 1.

FIG. 1A is a schematic hardware configuration diagram illustrating main parts of a thermal displacement compensation apparatus according to the first embodiment.

A CPU 11 included in a thermal displacement compensation apparatus 1 according to the present embodiment is a processor that controls the thermal displacement compensation apparatus 1 as a whole. The CPU 11 reads a system program stored in a ROM 12 via a bus 20, and controls the entire thermal displacement compensation apparatus 1 according to the system program. A RAM 13 temporarily stores temporary calculation data, display data, and various data input from a controller and a shape measuring device to be described later.

A nonvolatile memory 14 is configured as a memory, which is backed up by, for example, a battery (not shown) and keeps the memory state even when the power of the thermal displacement compensation apparatus 1 is turned off, and stores various programs and data input via an interface (not shown). The programs and data stored in the nonvolatile memory 14 may be deployed in the RAM 13 at the time of execution/use. Various types of system programs are written in the ROM 12 beforehand.

Figure 1B:
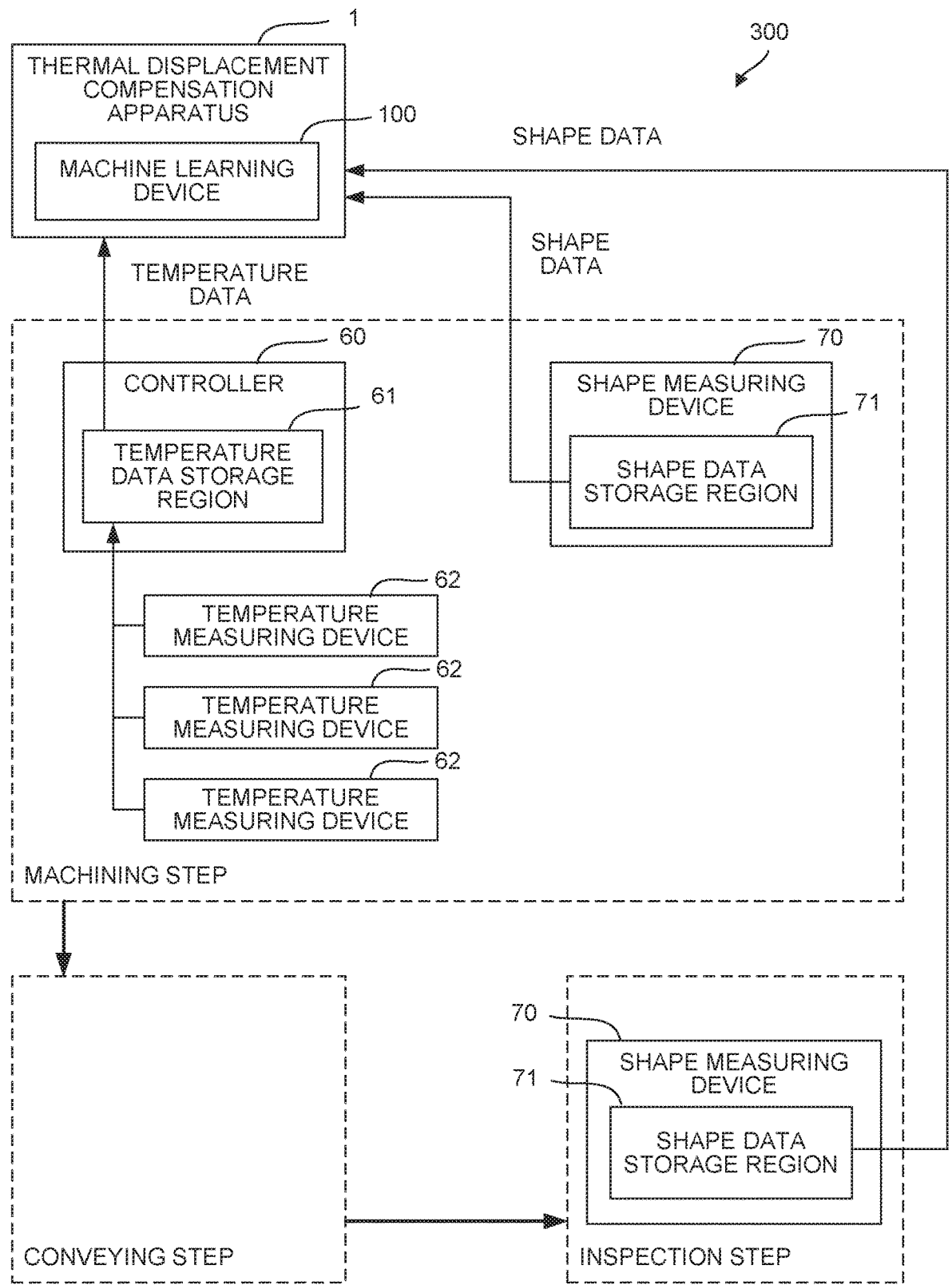
FIG. 1B is a block diagram illustrating the configuration of the first example of a thermal displacement compensation system.
Figure 1C:
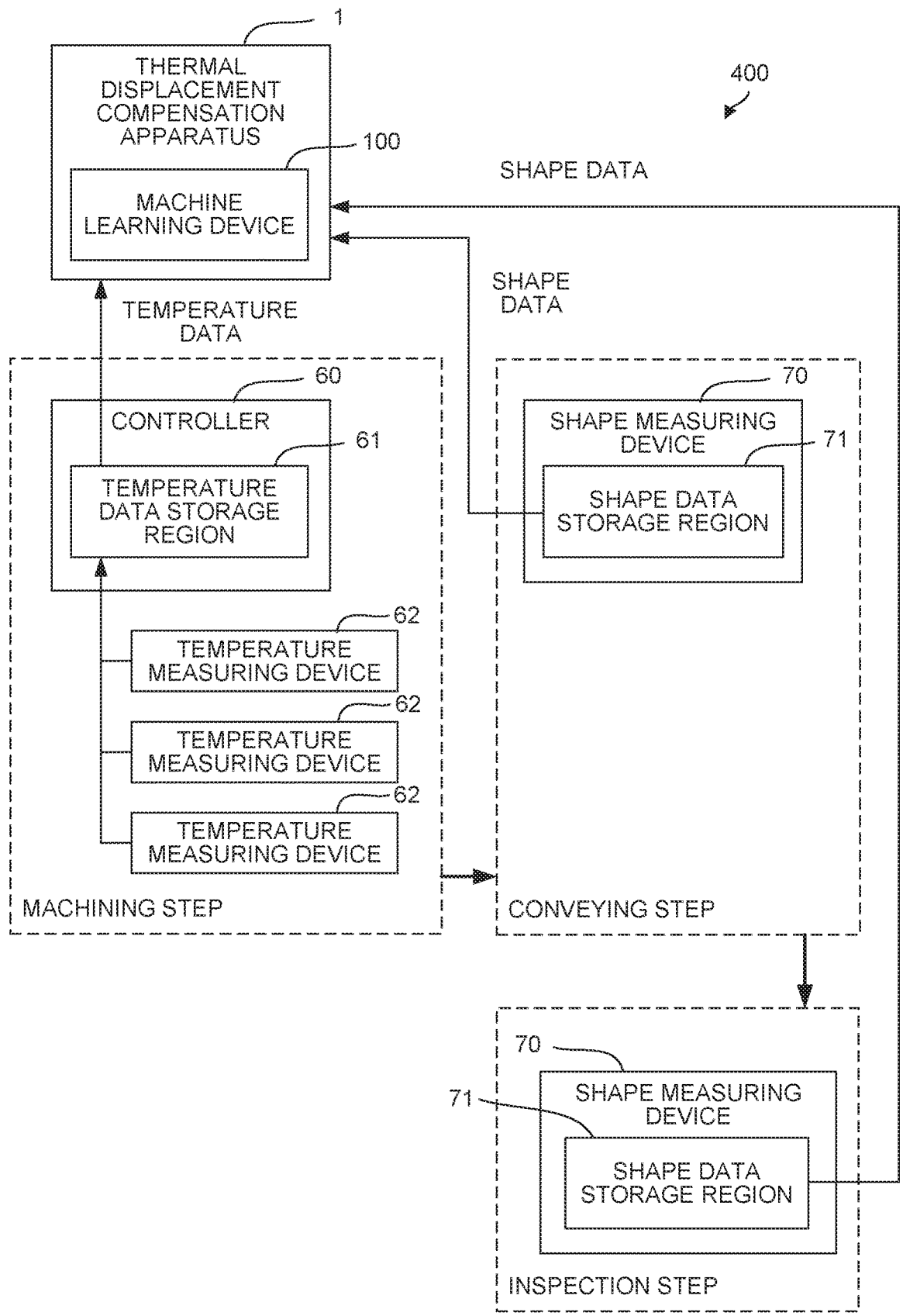
FIG. 1C is a block diagram illustrating the configuration of the second example of the thermal displacement compensation system.
Figure 1D:
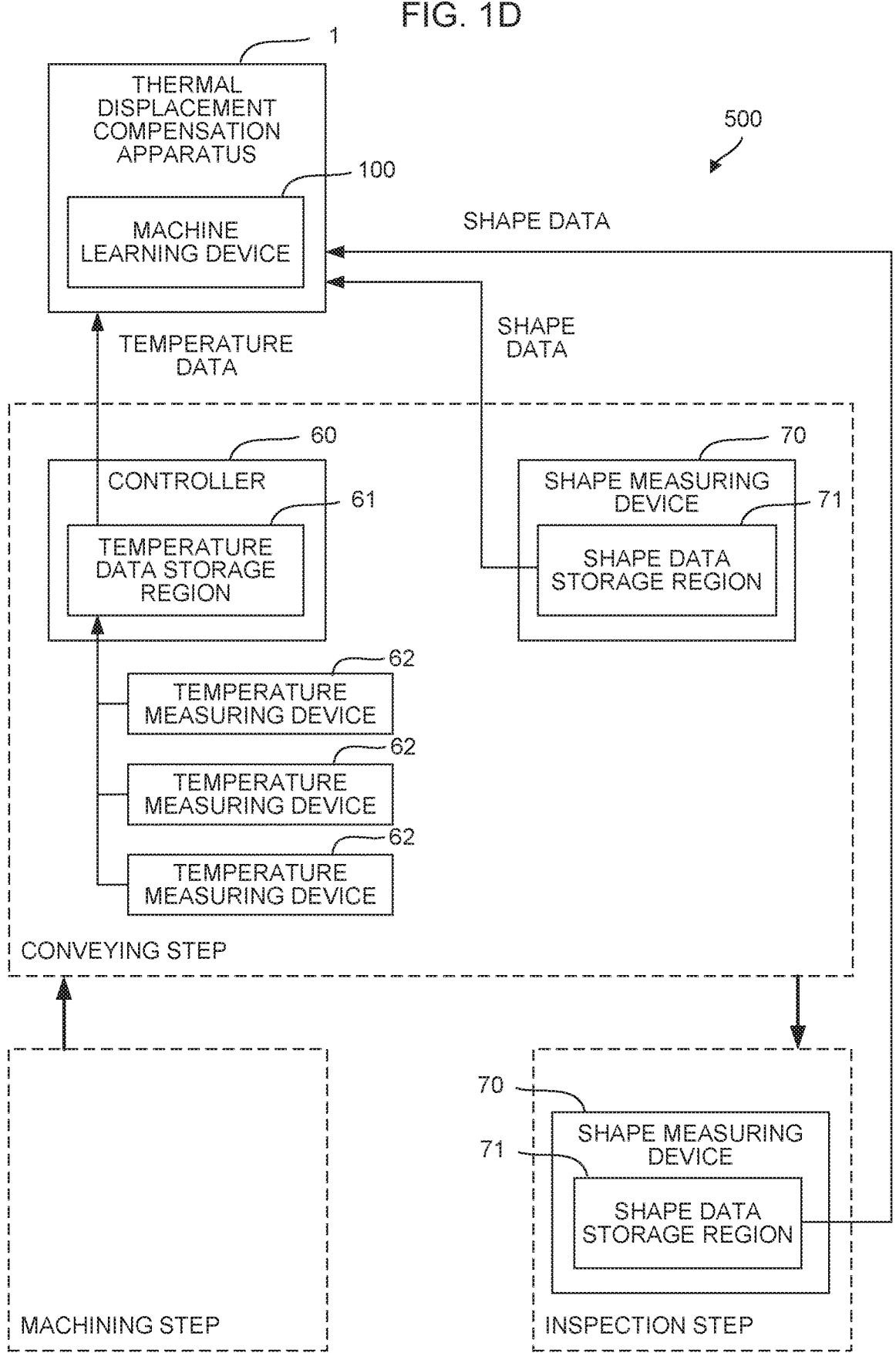
FIG. 1D is a block diagram illustrating the configuration of the third example of the thermal displacement compensation system.

A controller 60 controls a machine tool for machining a workpiece, an accompanying robot and a loader device (hereinafter simply referred to as the machine tool). As illustrated in FIGS. 1B to 1D, the controller 60 has a temperature data storage region 61. One or more temperature measuring devices 62 installed in the machine tool measure(s) the temperature of the workpiece after machining, and the obtained temperature data is temporarily stored in the temperature data storage region 61. The thermal displacement compensation apparatus 1 receives the temperature data from the controller 60 via an interface 18 and delivers the data to the CPU 11.

A shape measuring device 70 measures the shape of the workpiece machined by the machine tool. The shape measuring device 70 is, for example, a three-dimensional measuring device, a displacement sensor, or a touch probe. As illustrated in FIGS. 1B to 1D, the shape measuring device 70 has a shape data storage region 71. The shape data storage region 71 temporarily stores shape data obtained by measurement. The thermal displacement compensation apparatus 1 receives the shape data from the shape measuring device 70 via an interface 19, and delivers the data to the CPU 11.

An interface 21 is an interface for connecting the thermal displacement compensation apparatus 1 and a machine learning device 100. The machine learning device 100 includes a processor 101 that controls the entire machine learning device 100, a ROM 102 that stores system programs, etc., a RAM 103 for temporarily storing each process related to machine learning, and a nonvolatile memory 104 for storing learning models, etc. The machine learning device 100 can observe each piece of information (temperature data, shape data, etc.) acquirable by the thermal displacement compensation apparatus 1 via the interface 21.

FIG. 1B is a block diagram illustrating the first example of a thermal displacement compensation system 300 including the thermal displacement compensation apparatus 1.

In the thermal displacement compensation system 300, at least one temperature measuring device 62 is installed in the machine tool. In the step of machining a workpiece, image data showing the temperature distribution of the workpiece after machining is acquired using the temperature measuring device 62. Similarly, shape data of the workpiece after machining is measured by the shape measuring device 70. Subsequently, the workpiece is conveyed to an inspection step (typically, the location for shipment inspection). In the machining step, the workpiece has not reached a state of thermal equilibrium (or a predetermined temperature which is set in consideration of the use environment of the workpiece, etc.). In the inspection step, another shape measuring device 70 measures shape measurement data at the time of inspection. In the inspection step, it is assumed that the workpiece is in a state of thermal equilibrium (or at the predetermined temperature which is set in consideration of the use environment of the workpiece, etc.).

FIG. 1C is a block diagram illustrating the second example of a thermal displacement compensation system 400 including the thermal displacement compensation apparatus 1.

In the thermal displacement compensation system 400, at least one temperature measuring device 62 is installed in the machine tool. In the step of machining a workpiece, image data showing the temperature distribution of the workpiece after machining is acquired using the temperature measuring device 62. Subsequently, after the step of machining the workpiece is completed, the shape measuring device 70 measures shape data of the workpiece after machining, for example, on a conveying path to the inspection step. In the machining step and conveying step, the workpiece has not yet reached the state of thermal equilibrium (or a predetermined temperature which is set in consideration of the use environment of the workpiece, etc.). Next, in the inspection step of the workpiece, another shape measuring device 70 measures shape measurement data at the time of inspection. In the inspection step, it is assumed that the workpiece is in a state of thermal equilibrium (or at the predetermined temperature which is set in consideration of the use environment of the workpiece, etc.).

FIG. 1D is a block diagram illustrating the third configuration example of a thermal displacement compensation system 500 including the thermal displacement compensation apparatus 1.

In the thermal displacement compensation system 500, at least one temperature measuring device 62 is installed outside a machine tool. After the step of machining a workpiece is completed, for example, on a conveying path to the inspection step, image data showing the temperature distribution of the workpiece is acquired using the temperature measuring device 62. Similarly, shape data of the workpiece after machining is measured with the shape measuring device 70. On the conveying path, the workpiece has not yet reached a state of thermal equilibrium (or a predetermined temperature which is set in consideration of the use environment of the workpiece, etc.). Subsequently, in the inspection step of the workpiece, another shape measuring device 70 measures shape measurement data at the time of inspection. In the inspection step, it is assumed that the workpiece is in a state of thermal equilibrium (or at the predetermined temperature which is set in consideration of the use environment of the workpiece, etc.).

According to the third example of the thermal displacement compensation system 500 illustrated in FIG. 1D, there is an advantage that the cycle time of the machine tool can be shortened. On the other hand, according to the first example of the thermal displacement compensation system 300 illustrated in FIG. 1B, there is an advantage that the accuracy of learning and estimation is increased. The conveying path is affected by the temperature in the factory, but inside the machine tool, the influence from the outside is smaller.

In the first and third examples of the thermal displacement compensation systems 300 and 500 illustrated in FIG. 1B and FIG. 1D, it is not always necessary to simultaneously acquire the image data showing the temperature distribution of the workpiece and the shape data of the workpiece after machining. The acquisition timings of these pieces of data can be different. However, the acquisition timing of the image data showing the temperature distribution of the workpiece and the acquisition timing of the shape data of the workpiece after machining need to be always constant throughout both the learning and estimation phases.

Figure 2:
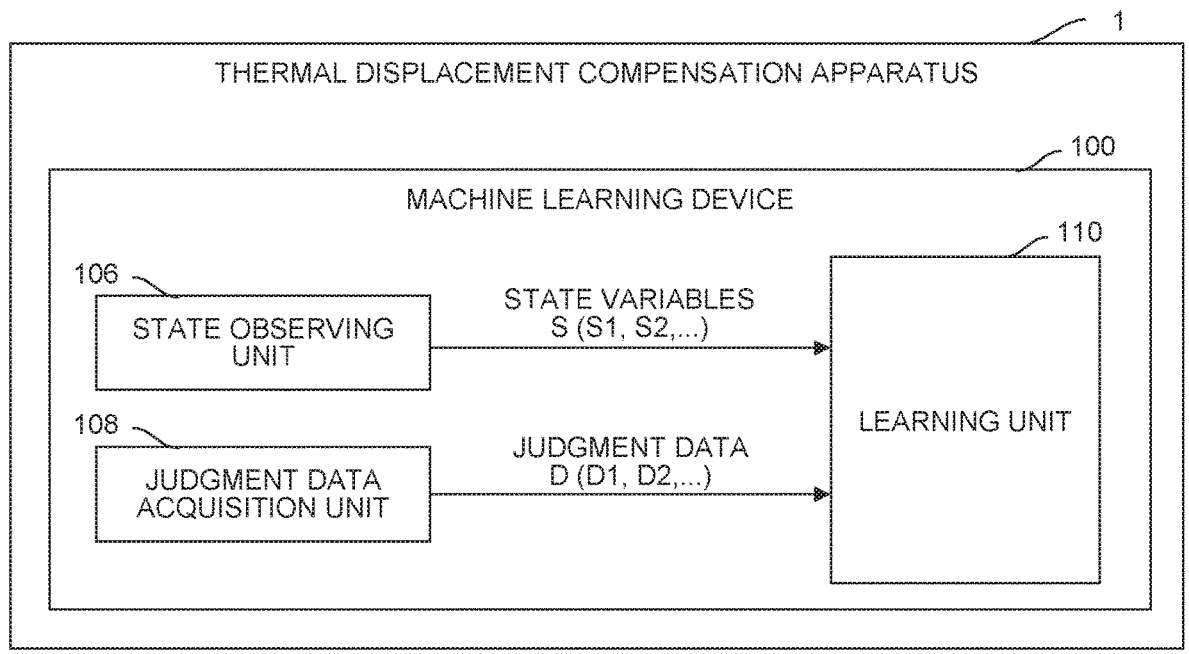
FIG. 2 is a block diagram illustrating the configuration of the thermal displacement compensation apparatus 1.

FIG. 2 is a schematic functional block diagram of the thermal displacement compensation apparatus 1 and the machine learning device 100 according to the first embodiment.

The machine learning device 100 includes software (a learning algorithm, etc.) for self-learning, by so-called machine learning, shape measurement data at the time of inspection with respect to the image data showing the temperature distribution of a workpiece and the shape data after machining, and hardware (the processor 101, etc.). What the machine learning device 100 is learning corresponds to a model structure representing the correlation between the image data showing the temperature distribution of the workpiece and shape data after machining and the shape measurement data at the time of inspection.

As shown in the functional block in FIG. 2, the machine learning device 100 included in the thermal displacement compensation apparatus 1 comprises: a state observing unit 106 for observing image data S1 showing the temperature distribution of a workpiece and shape data after machining S2 as state variables S representing the current state of the environment; a judgment data acquisition unit 108 for acquiring shape measurement data D1 at the time of inspection as judgment data D; and a learning unit 110 for learning the image data showing the temperature distribution of the workpiece and shape data after machining and the shape measurement data at the time of inspection in association with each other using the state variables S and the judgment data D.

The state observing unit 106 may be configured as one function of the processor 101, or as software stored in the ROM 102 for enabling the processor 101 to function. Among the state variables S observed by the state observing unit 106, the temperature distribution S1 of the workpiece can be acquired by an output of the temperature measuring device 62. The temperature measuring device 62 is typically thermography. The thermography may output image data captured from one predetermined direction, or a set of image data captured from multiple directions using a robot or the like. Alternatively, the temperature measuring device 62 may be an array of a plurality of non-contact type thermometers.

Image data output by the temperature measuring device 62 may be obtained by photographing a workpiece after machining with the thermography, although not illustrated, in which, for example, a relatively high temperature portion is colored red and a relatively low temperature portion is colored blue. In other words, in this image data, the temperature distribution of the surface of the workpiece is expressed by color data.

For the shape data after machining S2 among the state variables S, it is possible to use the shape data of the workpiece after machining output by a known inspection device. The shape data is a set of dimensional values of each portion (one or more predetermined portions) of the workpiece. Both the image data S1 showing the temperature distribution of the workpiece and the shape data after machining S2 indicate the temperature distribution and shape of the workpiece after machining, that is, in a state in which thermal equilibrium has not been sufficiently attained (or a state not reaching a predetermined temperature which is set in consideration of the use environment of the workpiece, etc.).

The judgement data acquisition unit 108 may be configured as one function of the processor 101, or may be configured as software stored in the ROM 102 for enabling the processor 101 to function. The judgement data acquisition unit 108 can use the shape measurement data D1 at the time of inspection as judgement data D. For the shape measurement data D1 at the time of inspection, it is possible to use the shape data of the workpiece at the time of inspection output by a known inspection device. As the shape measurement data D1 at the time of inspection, it is possible to use, for example, an error between the designed values and the actual dimensions of the workpiece at the time of inspection, that is, in a state of sufficient thermal equilibrium (or a state reaching the predetermined temperature which is set in consideration of the use environment of the workpiece, etc.). Here, the error may be the actual dimensions, or values obtained by evaluating the error according to a predetermined criterion (for example, an index of roundness or information indicating whether or not the values are within a predetermined threshold range). As the shape measurement data D1 at the time of inspection, a set of measurement results at a plurality of measurement locations may also be used.

The learning unit 110 may be configured as one function of the processor 101, or may be configured as software stored in the ROM 102 for enabling the processor 101 to function. In accordance with an arbitrary learning algorithm generally called machine learning, the learning unit 110 learns shape measurement data at the time of inspection with respect to the image data showing the temperature distribution of the workpiece and the shape data after machining. The learning unit 110 can repeatedly execute learning based on the data set including the above-described state variables S and the judgement data D.

By repeating such a learning cycle, the learning unit 110 can automatically identify features implying the correlation between the image data S1 showing the temperature distribution of the workpiece and shape data after machining S2 and the shape measurement data D1 at the time of inspection. The correlation between the image data S1 showing the temperature distribution of the workpiece and shape data after machining S2 and the shape measurement data D1 at the time of inspection is actually unknown at the start of the learning algorithm, but the learning unit 110 gradually identifies the features and interprets the correlation as the learning progresses.

When the correlation between the image data S1 showing the temperature distribution of the workpiece and shape data after machining S2 and the shape measurement data D1 at the time of inspection is interpreted to a certain reliable level, the learning results output repeatedly by the learning unit 110 can be used to estimate what shape measurement data at the time of inspection should be for the current state (the image data showing the temperature distribution of the workpiece and shape data after machining). In short, with the progress of the learning algorithm, the learning unit 110 can gradually make the correlation between the image data showing the temperature distribution of the workpiece and shape data after machining and the shape measurement data at the time of inspection close to the optimal solution.

As described above, the machine learning device 100 included in the thermal displacement compensation apparatus 1 uses the state variables S observed by the state observing unit 106 and the judgement data D acquired by the judgement data acquisition unit 108, and the learning unit 110 learns the shape measurement data at the time of inspection, in accordance with the machine learning algorithm. Here, the state variables S are composed of data which is less likely affected by outside disturbances, such as the image data S1 showing the temperature distribution of the workpiece and the shape data after machining S2. The judgement data D is unambiguously obtained by acquiring the shape measurement data D1 at the time of inspection. Thus, according to the machine learning device 100 included in the thermal displacement compensation apparatus 1, with the use of the learning results in the learning unit 110, shape measurement data at the time of inspection according to the image data showing the temperature distribution of the workpiece and the shape data after machining can be automatically and accurately obtained without depending on calculation or estimation.

Then, if the shape measurement data at the time of inspection can be automatically obtained without depending on calculation or estimation, it is possible to quickly estimate appropriate values of the shape measurement data at the time of inspection by merely grasping the image data S1 showing the temperature distribution of the workpiece and the shape data after machining S2. Therefore, it is unnecessary to wait until the workpiece reaches a state of thermal equilibrium (or a state reaching a predetermined temperature which is set in consideration of the use environment of the workpiece, etc.), and the dimensional inspection can be performed while still including a variation in temperature.

In the machine learning device 100 with the above configuration, the learning algorithm executed by the learning unit 110 is not particularly limited, and a learning algorithm known as machine learning can be employed.

Figure 3:
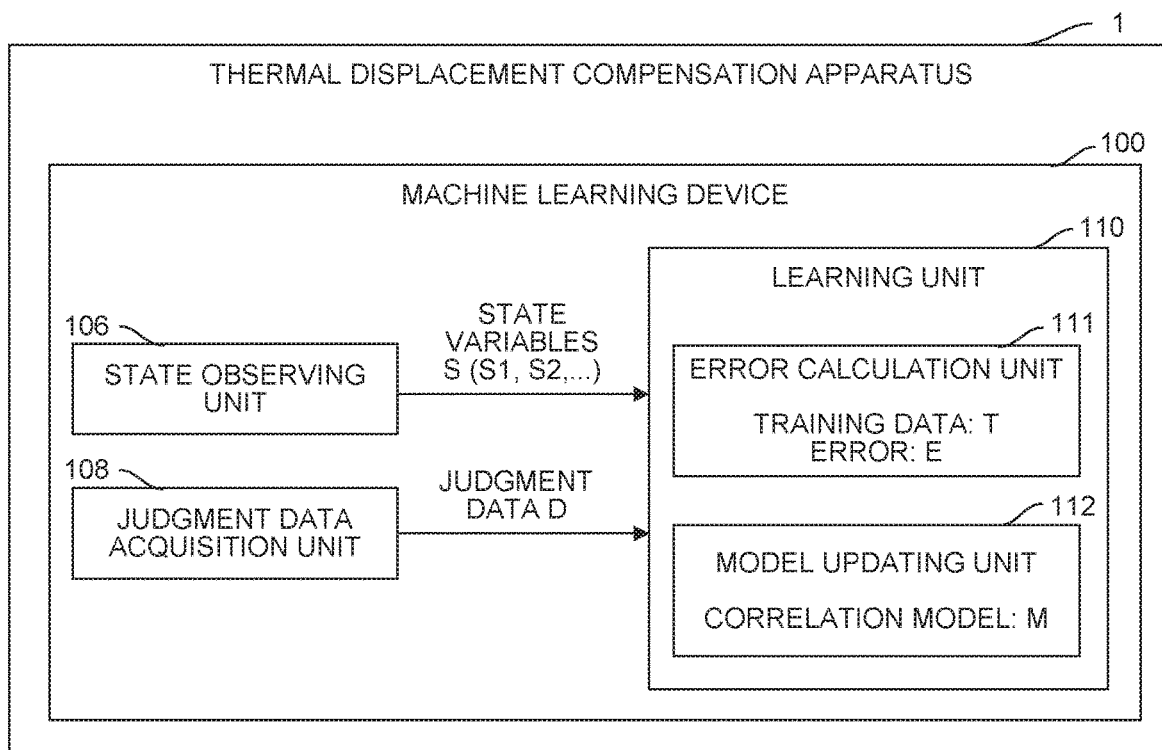
FIG. 3 is a block diagram illustrating the configuration of one form of the thermal displacement compensation apparatus 1 illustrated in FIG. 2 (including a learning unit for executing supervised learning as an example of a learning algorithm)

FIG. 3 illustrates, as one form of the thermal displacement compensation apparatus 1 illustrated in FIG. 2, a configuration including a learning unit 110 that executes supervised learning as an example of a learning algorithm.

Supervised learning is a technique of learning a correlation model (shape measurement data at the time of inspection with respect to image data showing the temperature distribution of a workpiece and shape data after machining) for estimating a required output for a new input by a large amount of known data sets (called training data) of inputs and corresponding outputs given in advance and identifying features that imply the correlations between the inputs and the outputs from the training data.

In the machine learning device 100 included in the thermal displacement compensation apparatus 1 illustrated in FIG. 3, the learning unit 110 comprises an error calculation unit 111 for calculating an error E between a correlation model M for deriving shape measurement data at the time of inspection from the state variables S and correlation features identified from training data T prepared in advance, and a model updating unit 112 for updating the correlation model M to reduce the error E. In the learning unit 110, the model updating unit 112 repeatedly updates the correlation model M, thereby leaning the shape measurement data at the time of inspection with respect to the image data showing the temperature distribution of the workpiece and the shape data after machining.

The correlation model M can be built by regression analysis, reinforcement learning, deep learning, etc. The initial values of the correlation model M are given to the learning unit 110 before starting supervised learning, for example, as values representing the correlation between the state variable S and the shape measurement data at the time of inspection in a simplified form. The training data T can include, for example, empirical values accumulated by recording shape measurement data at the time of inspection with respect to image data showing the temperature distribution of the past workpieces and shape data after machining (a known data set of image data showing the temperature distribution of the workpieces and shape data after machining and the shape measurement data at the time of inspection), and is given to the learning unit 110 before starting supervised learning. The error calculation unit 111 identifies the correlation features that imply the correlation between image data showing the temperature distribution of the workpiece and shape data after machining and the shape measurement data at the time of inspection from the large amount of training data T given to the learning unit 110, and calculates the error E between the correlation features and a correlation model M corresponding to the state variable S in the current state. The model updating unit 112 updates the correlation model M in the direction of reducing the error E, for example, according to a predetermined updating rule.

In the next learning cycle, the error calculation unit 111 uses the state variables S and the judgement data D obtained by executing the machining step and inspection step of the workpiece in accordance with the updated correlation model M in order to find the error E with respect to the correlation model M corresponding to the state variables S and the judgement data D, and the model updating unit 112 updates the correlation model M again.

Thus, the correlation between the current state of unknown environment (the image data showing the temperature distribution of the workpiece and shape data after machining) and the corresponding state (shape measurement data at the time of inspection) is gradually found. In other words, by updating the correlation model M, the relationship between the image data showing the temperature distribution of the workpiece and shape data after machining and the shape measurement data at the time of inspection gradually approaches the optimal solution.

Figure 4A:
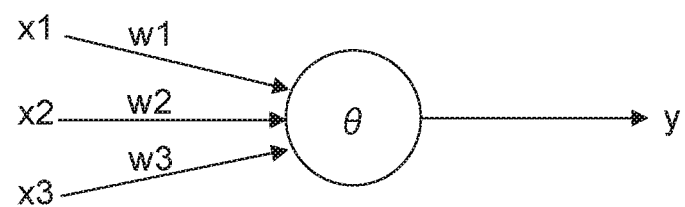
FIG. 4A is a diagram for explaining a neuron.
Figure 4B:
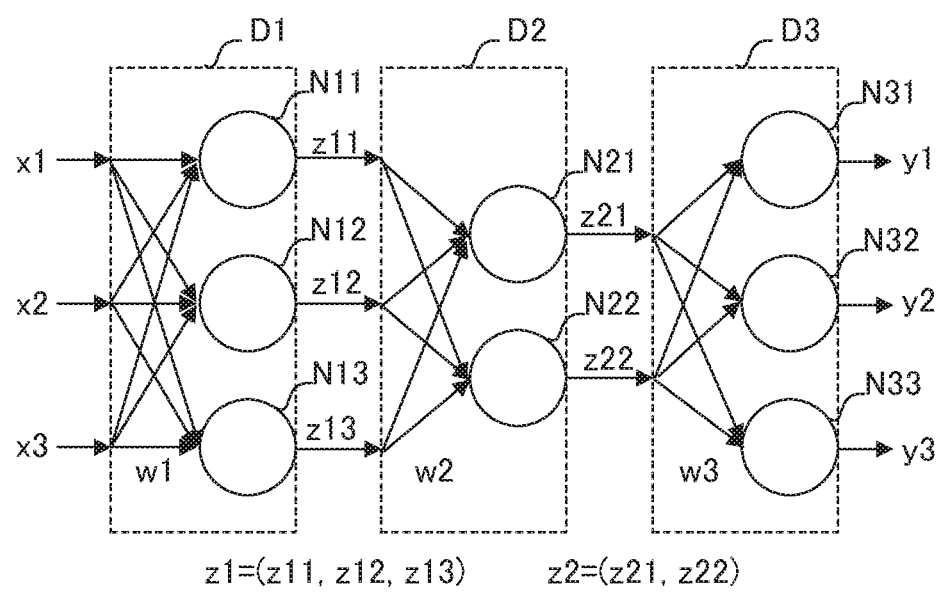
FIG. 4B is a diagram schematically illustrating a model of a three-layer neural network formed by combining the neurons illustrated in FIG. 4A.

For example, a neural network can be used when proceeding with the above-described supervised learning. FIG. 4A schematically illustrates a model of a neuron. FIG. 4B schematically illustrates a model of a three-layer neural network constructed by combining the neurons illustrated in FIG. 4A. The neural network can be constructed from, for example, an arithmetic unit, a storage unit, etc., imitating a model of neurons.

The neuron illustrated in FIG. 4A outputs a result y for a plurality of inputs x (here, for example, inputs x1 to x3). Each of the inputs x1 to x3 is multiplied by a weight w (w1 to w3) corresponding to the input x. As a result, the neuron outputs the result y expressed by Expression (1) below. In Expression (1), the input x, result y and weight w are all vectors. $\theta$ is a bias, and $f_k$ is an activation function.

[Expression 1]

$$y = f_k(\Sigma_{i=1}^{n} x_i w_i - \theta) \qquad (1)$$

In the three-layer neural network illustrated in FIG. 4B, a plurality of inputs x (here, for example, inputs x1 to x3) are input from the left side, and the results y (here, for example, results y1 to y3) are output from the right side. In the illustrated example, each of the inputs x1, x2, x3 is multiplied by a corresponding weight (represented generally by w1), and each of the inputs x1, x2, and x3 is input to three neurons N11, N12, N13.

In FIG. 4B, outputs of the neurons N11 to N13 are generally represented by z1. z1 can be regarded as a feature vector obtained by extracting the feature amount of the input vector. In the illustrated example, each of the feature vectors z1 is multiplied by a corresponding weight (represented generally by W2), and each of the feature vectors z1 is input to two neurons N21 and N22. The feature vector z1 represents a feature between the weight W1 and the weight W2.

Further, the outputs of the neurons N21 to N22 are generally represented by z2. z2 can be regarded as a feature vector obtained by extracting the feature amount of the feature vector z1. In the illustrated example, each of the feature vectors z2 is multiplied by a corresponding weight (represented generally by W3), and each of the feature vectors z2 is input to three neurons N31, N32, and N33. The feature vector z2 represents a feature between the weight W2 and the weight W3. Finally, the neurons N31 to N33 output the results y1 to y3, respectively.

In the machine learning device 100 included in the thermal displacement compensation apparatus 1, the learning unit 110 performs calculations in the multilayer structure according to the above-described neural network, with the state variables S as the inputs x, thereby outputting estimated values (results y) of the dimensions of the workpiece. The operation modes of the neural network are a learning mode and a judgement mode. For example, in the learning mode, the learning data set can be used to learn the weight W, and, in the judgement mode, the learned weight W can be used to judge the shape measurement data at the time of inspection. In the judgement mode, it is also possible to perform detection, classification, inference, etc.

The configuration of the thermal displacement compensation apparatus 1 and the machine learning device 100 can be described as a machine learning method (or software) to be executed by the CPU 11 or the processor 101. This machine learning method is a machine learning method for learning shape measurement data at the time of inspection with respect to image data showing the temperature distribution of a workpiece and shape data after machining, and comprises the steps of:

the CPU 11 or the processor 101 observing the image data showing the temperature distribution of the workpiece and shape data after machining as state variables S representing the current state of environment;

acquiring shape measurement data at the time of inspection as judgement data D; and learning the image data showing the temperature distribution of the workpiece and shape data after machining and the shape measurement data at the time of inspection in association with each other using the state variables S and the judgement data D.

According to the present embodiment, the machine learning device 100 generates a model representing the correlation between the image data showing the temperature distribution of the workpiece and shape data after machining and the shape measurement data at the time of inspection. Consequently, even if a variation in temperature is still included, it is possible to estimate the dimensions of the workpiece in a state of sufficient thermal equilibrium (or at a predetermined temperature which is set in consideration of the use environment of the workpiece, etc.). Thus, once a learning model is created, an exclusive examination environment is not required thereafter. In addition, the time for the inspection step can be shortened, and the know-how to determine temperature measuring locations is also not required.

Figure 5:
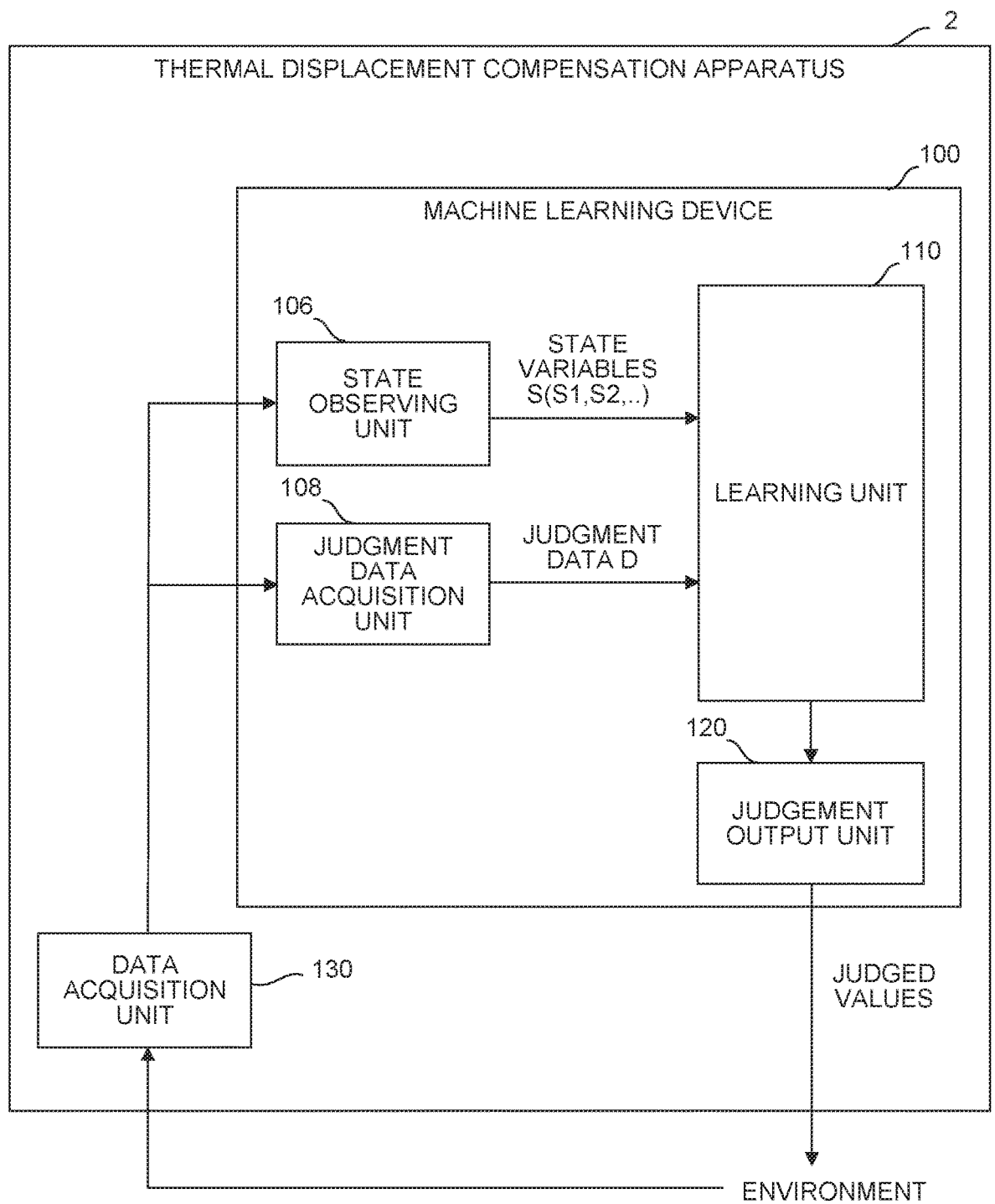
FIG. 5 is a block diagram illustrating the configuration of a thermal displacement compensation apparatus 2.

FIG. 5 shows a thermal displacement compensation apparatus 2 according to the second embodiment.

The thermal displacement compensation apparatus 2 includes a machine learning device 100 and a data acquisition unit 130. The data acquisition unit 130 acquires image data showing the temperature distribution of a workpiece, shape data after machining, and shape measurement data at the time of inspection, from a temperature measuring device 62 and a shape measuring device 70.

In addition to the configuration of the machine learning device 100 (FIG. 3) of the first embodiment, the machine learning device 100 included in the thermal displacement compensation apparatus 2 includes a judgement output unit 120 for outputting shape measurement data at the time of inspection, which was judged by the learning unit 110 based on the image data showing the temperature distribution of the workpiece and shape data after machining, as a character, image, sound, speech or data in an arbitrary format.

The judgement output unit 120 may be configured as one function of the processor 101, or may be configured as software for enabling the processor 101 to function. The judgement output unit 120 outputs the shape measurement data at the time of inspection, which was judged by the learning unit 110 based on the image data showing the temperature distribution of the workpiece and the shape data after machining, as a character, image, sound, speech or data in an arbitrary format to outside. The output estimation result can be used, for example, for detection of dimensional abnormality. The workpiece having dimensional abnormality may be re-machined, if necessary.

The machine learning device 100 included in the thermal displacement compensation apparatus 2 having the above configuration exhibits the same effect as the above-described machine learning device 100. In particular, the machine learning device 100 in the thermal displacement compensation apparatus 2 of FIG. 5 can change the state of the environment by the output of the judgement output unit 120. On the other hand, in the machine learning device 100 of the thermal displacement compensation apparatus 1 of FIG. 3, a function corresponding to the judgement output unit for reflecting the learning results of the learning unit 110 to the environment can be left to an external device.

Figure 6:
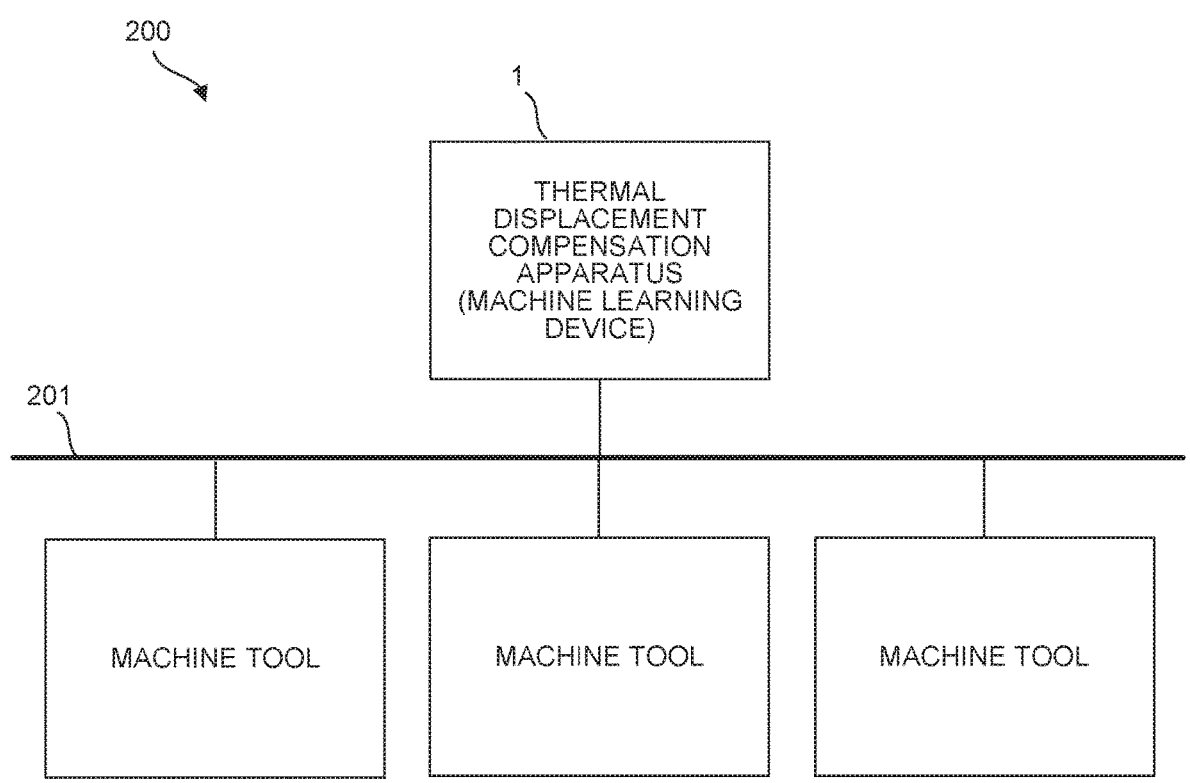
FIG. 6 is a block diagram illustrating the configuration of a thermal displacement compensation system.

FIG. 6 shows a thermal displacement compensation system 200 including a plurality of machine tools.

The thermal displacement compensation system 200 comprises a thermal displacement compensation apparatus 1 (or 2), a plurality of machine tools with identical machine configuration, and a network 201 connecting the machine tools and the thermal displacement compensation apparatus 1 (or 2) with each other. Each of the machine tools may independently include a controller 60 and a shape measuring device 70, or a plurality of machine tools may share one controller 60 and one shape measuring device 70.

In the thermal displacement compensation system 200 with the above configuration, the thermal displacement compensation apparatus 1 (or 2) can learn, based on the state variables S and the judgement data D obtained for each of the plurality of machine tools, the shape measurement data at the time of inspection with respect to the image data showing the temperature distribution of the workpiece and shape data after machining common to all the machine tools.

The thermal displacement compensation system 200 can have a configuration that realizes the thermal displacement compensation apparatus 1 (or 2) by cloud computing (distributed processing environment prepared for the network 201), fog computing or edge computing (distributed processing environment prepared between the cloud and the machine tools). With this configuration, it is possible to connect a required number of machine tools to the thermal displacement compensation apparatus 1 (or 2) when necessary, regardless of the location or time at which each of the plurality of machine tools is present.

An operator of the thermal displacement compensation system 200 can determine whether or not the progress of learning, by the thermal displacement compensation apparatus 1 (or 2), the relationship between the image data showing the temperature distribution of the workpiece and shape data after machining and the shape measurement data at the time of inspection has reached a required level, at an appropriate time after the thermal displacement compensation apparatus 1 (or 2) starts learning.

The embodiments of the present invention have been described above, but the present invention is not limited to only the examples of the above-described embodiments and can be implemented in various modes by making appropriate changes.

For example, the above-described embodiments describe the examples using the image data showing the temperature distribution of the workpiece and shape data after machining as the state variable S, but the present invention is not limited thereto. In addition to these pieces of data, the state variable S may include, for example, the ambient temperature (the temperature of the machine tool, the temperature of the table on which the workpiece is placed, the temperature of the column supporting the main spindle, the factory atmosphere temperature, etc.). The ambient temperature can also be input as image data showing the temperature distribution. Consequently, more elements affecting thermal displacement can be taken into consideration, and it is therefore possible to improve the accuracy of learning and estimation. Further, if the temperature of the machine tool is used as the state variable S, it is possible to eliminate or reduce the warm-up operation time of the machine tool.

Moreover, the operation time after turning on the power of the machine tool may be used as the state variable S. The operation time after turning on the power of the machine tool and the temperature of the machine tool can also be used as the state variable S. Thus, it is possible to eliminate or reduce the warm-up operation time of the machine tool.

Further, in the above-described embodiments, in the examples illustrated in FIG. 1B and FIG. 1D, it was necessary that the acquisition timing of image data showing the temperature distribution of the workpiece and the acquisition timing of shape data of the workpiece after machining are always constant, that is, the time lag between acquiring the image data showing the temperature distribution of the workpiece and acquiring the shape data of the workpiece after machining is constant. However, if information about the acquisition time of the image data showing the temperature distribution of the workpiece and the shape data of the workpiece after machining, for example, the measured value of the time lag, is further used as the state variable S, the time lag is not necessary constant. Accordingly, even when the time lag is not constant due to, for example, a stop of the factory line, it is possible to learn and estimate the shape measurement data at the time of inspection with respect to the image data showing the temperature distribution of the workpiece and the shape data after machining.

The invention claimed is:

1. A thermal displacement compensation apparatus for compensating a dimensional measurement error due to a thermal displacement of a workpiece, the thermal displacement compensation apparatus comprising a machine learning device for learning shape measurement data at a time of inspection of the workpiece, wherein
the machine learning device includes:
a state observing unit for observing image data showing a temperature distribution of a workpiece and shape data after machining as state variables representing a current state of environment;
a judgment data acquisition unit for acquiring judgment data indicating shape measurement data inspected in a state in which thermal equilibrium has been attained; and
a learning unit for learning the image data showing the temperature distribution of the workpiece and shape data after machining and the shape measurement data inspected in a state in which thermal equilibrium has been attained in association with each other using the state variables and the judgment data.

2. The thermal displacement compensation apparatus according to claim 1, wherein the state variables include ambient temperature of the workpiece.

3. The thermal displacement compensation apparatus according to claim 2, wherein the ambient temperature of the workpiece is a temperature of a machine tool for machining the workpiece.

4. The thermal displacement compensation apparatus according to claim 1, wherein the state variables include information about an acquisition time of the image data showing the temperature distribution of the workpiece and an acquisition time of the shape data after machining.

5. The thermal displacement compensation apparatus according to claim 1, wherein the judgement data includes an evaluation result of an error between actual dimensions and designed values of the workpiece.

6. The thermal displacement compensation apparatus according to claim 1, wherein the learning unit calculates the state variables and the judgement data in a multilayer structure.

7. The thermal displacement compensation apparatus according to claim 1, wherein the learning unit uses the state variables obtained from the workpiece machined by a plurality of machine tools and the judgment data to learn the shape measurement data at the time of inspection.

8. The thermal displacement compensation apparatus according to claim 1, wherein the machine learning device is realized by cloud computing, fog computing, or edge computing.

9. A machine learning device for learning shape measurement data at a time of inspection of a workpiece, comprising:
a state observing unit for observing image data showing a temperature distribution of a workpiece and shape data after machining as state variables representing a current state of environment;
a judgment data acquisition unit for acquiring judgment data indicating shape measurement data inspected in a state in which thermal equilibrium has been attained; and
a learning unit for learning the image data showing the temperature distribution of the workpiece and shape data after machining and the shape measurement data inspected in a state in which thermal equilibrium has been attained in association with each other using the state variables and the judgment data.

* * * * *